United States Patent [19]

Reutlinger

[11] Patent Number: 4,475,393
[45] Date of Patent: Oct. 9, 1984

[54] METHOD AND DEVICE FOR POSITIONING WORKPIECES TO BE BALANCED

[76] Inventor: Wolf-Dieter Reutlinger, Novalisstrasse 5, D-6100 Darmstadt, Fed. Rep. of Germany

[21] Appl. No.: 464,017

[22] Filed: Feb. 4, 1983

[30] Foreign Application Priority Data

Feb. 5, 1982 [DE] Fed. Rep. of Germany ....... 3204016

[51] Int. Cl.$^3$ .............................................. G01M 1/08
[52] U.S. Cl. ........................................ 73/462; 73/464
[58] Field of Search ................................. 73/462, 464

[56] References Cited

U.S. PATENT DOCUMENTS

| | | | |
|---|---|---|---|
| 3,184,976 | 5/1965 | Greiner | 73/462 |
| 4,064,761 | 12/1977 | Giers et al. | 73/462 |
| 4,201,091 | 5/1980 | Guyot et al. | 73/462 |
| 4,419,894 | 12/1983 | Matumoto | 73/462 |

FOREIGN PATENT DOCUMENTS

| | | |
|---|---|---|
| 1170161 | 5/1964 | Fed. Rep. of Germany . |
| 2639268 | 4/1977 | Fed. Rep. of Germany . |
| 2724696 | 3/1980 | Fed. Rep. of Germany . |

*Primary Examiner*—James J. Gill
*Attorney, Agent, or Firm*—Lee, Smith & Zickert

[57] ABSTRACT

A workpiece to be balanced, which during a measuring run is driven or rotating in the coupling-free mode and is provided with a mark for contact-free pick-off to generate a reference signal, is to be positioned subsequently, that the unbalance is at a predetermined location below a marking or correcting device. To this end pulse sequences synchronous with the supporting rollers carrying the workpiece are generated. The pulses are counted in a counter between the reference signal and an unbalance position signal derived from the unbalance signal. For the positioning the counter is counted down to zero by these pulses starting from the reference pulse. When the counter passes through zero the unbalance is in the plane of the pick-off device for detecting the mark.

16 Claims, 5 Drawing Figures

METHOD AND DEVICE FOR POSITIONING WORKPIECES TO BE BALANCED

The invention relates to a method for positioning workpieces to be balanced such that the unbalance measured on supporting rollers by means of an unbalance measuring machine assumes a predetermined position, wherein (a) a reference signal is generated with each revolution of the workpiece, when the workpiece assumes a particular, predetermined angular position.

It is known to measure the unbalance of a workpiece on an unbalance measuring machine, wherein the workpiece is disengaged from a driving mechanism during measurement and runs down freely (U.S. Pat. No. 3,076,342). Such a kind of measurement offers the advantage that influences of the driving mechanism on the unbalance measurement are eliminated. A mark is applied to the workpiece and is picked up by a photoelectric pick-off device. The photoelectric pick-off device provides a reference signal. The phase of an unbalance measuring signal provided by the unbalance measuring machine relative to this reference signal corresponds to the angular position of the measured unbalance relative to the mark applied to the workpiece. In the U.S. Pat. No. 3,076,342 the reading of an unbalance indicating instrument is locked when the running out workpiece passes through a nominal rotational speed. This results in storage of the measured value.

It is also known to drive a workpiece to be balanced by means of a belt, by compressed air or by an electromagnetic field. In all these cases it is not possible to use a driving motor coupled with the workpiece as a reference for the unbalance position. Instead a reference signal is generated, as in U.S. Pat. No. 3,076,342, by scanning the periphery of the workpiece and detecting a mark applied thereto.

Instead of storing the unbalance measuring signals "mechanically", as in the U.S. Pat. No. 3,076,342, the signals may also be stored electrically. The electrically stored unbalance measuring signals can be supplied to an unbalance correcting machine for automatic unbalance correction (for example U.S. Pat. Nos. 3,446,100 or 2,779,217 or 4,214,481).

For unbalance correction it is necessary to rotate the unbalance into a particular position, for example to below a drilling machine, which removes material from the workpiece to correct for the unbalance. When the measuring run is carried out without positively driving the workpiece, this presents certain problems. A mark is applied to the workpiece and provides the reference signal and defines a reference longitudinal plane of the workpiece. The unbalance measuring machine provides a reading of an unbalance position angle, i.e. an angle by which the unbalance is angularly spaced from the reference longitudinal plane. It is by no means simple to find therefrom the exact spot of the workpiece in which the unbalance has to be corrected for. When the workpiece is connected with the driving motor in well-defined angular position through a coupling, a angle graduation can be provided on the rotor of the driving motor and the workpiece can be rotated together with the driving motor into a position corresponding to the stored unbalance position angle by means of this granduation. If, however, there is no such coupling, this mode of positioning is not possible.

It is known to stick stickers provided with graduations or to attach graduated discs with magnetic holding devices to one of the shaft ends of the workpiece, centered and such that the origin of the graduation points into the direction of the reference signal generating mark. Then the workpiece is adjusted after this graduation. As these graduations are attached spaced from the correction plane, in which the mark is located, it is difficult, in practice, to attach the sticker or the graduated disc correctly. Inaccuracies in the transfer of the measured unbalance position angle result in errors of the unbalance correction. Thereby additional measuring runs and additional correction procedures become necessary.

Furthermore it is known to attach graduated discs firmly to workpieces to be balanced and driven in the coupling-free mode. Also these methods have not proved satisfactory in practice. Graduated discs of film or paper can get loose during the measuring run and fly away. Sleeves of plastics are known which are provided with an angle graduation and are placed on the shaft end. Such sleeves can, however, easily be rotated unintentionally. Because of their mass and their tolerance of fit they impede the balancing accuracy that can be achieved. Thereby the advantage of increased balancing accuracy, which is to be achieved by a coupling-free driving mechanism, gets lost again. At any rate this method is not useful with single workpieces.

A device is known (German Offenlegungsschrift No. 2,852,468) which is held in contact with the periphery of the workpiece at the location of the mark generating the reference, signal, or is attached there magnetically. This device contains a mass rotatably suspended as pendulum. A pointer is affixed to this mass and therefore is always vertical. This pointer is movable over an angle graduation provided on the device. When the workpiece is rotated and therewith also the device is rotated relative to the vertical, the pointer will rotate in front of the angle graduation and indicate the angle of rotation of the workpiece. Then the workpiece is rotated about its axis, until the pointer indicates, on the angle graduation, the measured unbalance angle. The handling of this device is impractical or impossible with many types of workpieces.

Balancing machines are known, wherein during the measuring run on the unbalance measuring machine a pulse-like unbalance position signal is generated from the usually sinusoidal unbalance measuring signal with each revolution of the workpiece, said unbalance position signal having a fixed, predetermined phase relation with the unbalance measuring signal. Such an unbalance position signal serves to control a stroboscope, which illuminates the rotating workpiece. An angle graduation is provided on the periphery of the workpiece which permits reading of the position of the unbalance, if the workpiece is observed stroboscopically.

U.S. Pat. No. 4,046,017 discloses a wheel balancing apparatus for balancing an out-of-balance wheel that is mounted on a rotatable shaft. This apparatus includes force transducers positioned in a horizontal plane against resiliently supported bearings for the shaft to thereby detect horizontal components of the unbalance forces created by the out-of-balance wheel. Photosensitive switches associated with the shaft produce phase-displaced analog signals, which signals are supplied to a pulse producing circuit for generating a train of count pulses on one of two output lines depending on the direction of rotation of the shaft. A counter, which has a capacity exactly equal to the number of pulses generated by the pulse producing circuit per revolution of the shaft, is set when the horizontal component of the unbalance force for a particular correction plane associated with the counter equals zero. When a command to stop spinning the shaft has been issued, the shaft will slow down until it comes to a stop, but the counter will continue to count through each cycle of shaft revolution so that it will stop at a position wherein the relative rotative position of the unbalanced weight can be determined. A digital-to-analog converter responsive to the counter output provides a ramp voltage to drive a null meter and thereby permit the operator to rotate the wheel after it stops until the position of weight unbalance for the particular correction plane is provided in the predetermined location for providing a corrective weight—as is ascertained by bringing the null meter to the null position.

In this prior art apparatus, the body to be balanced is not mounted on supporting rollers and there is no coupling-free rotation during the measuring run. The body to be balanced is affixed to a shaft which forms part of the balancing apparatus. There is no reference mark on the body to be balanced. Thus the unbalance cannot be measured, while the body to be balanced is rotating freely from any drive mechanism. Once the body has been removed from the balancing apparatus, the measured unbalance position gets lost.

Similar balancing machines are disclosed in German Auslegeschrift No. 27 24 696 and German Offenlegungsschrift No. 25 18 459.

Eventually it is known to mount the workpiece to be balanced on pairs of supporting rollers (German Pat. No. 632,893, U.S. Pat. No. 2,779,217).

It is the object of the invention to provide a method and a device for positioning workpieces to be balanced which permits positioning of any type of workpieces without the need of attaching thereto any additional components, graduated discs or the like.

The method of the invention is characterized in that
  (b) during the measuring run on the unbalance measuring machine, an unbalance position signal is generated with each revolution of the workpiece from an unbalance measuring signal, said unbalance position signal having a fixed, predetermined phase relation with the unbalance measuring signal,
  (c) with each revolution of the supporting rollers a sequence of angle increment signals synchronized therewith is generated, each one of which corresponds to a fixed angle increment of the supporting roller,
  (d) during the measuring run, these angle increment signals are counted from the reference signal to the unbalance position signal and the number thereof is stored, and
  (e) for the subsequent positioning, the workpiece is rotated in the direction of rotation of the measuring run starting from a predetermined angular position through an angle which is a function of the stored number of angle increment signals.

Thus a measure of the rotation to be made is derived from the rotation of a supporting roller on which the workpiece to be balanced is mounted. The angle of rotation of the supporting roller is determined by counting the angle increment signals which have been counted from the reference signal to the unbalance position signal. The angle of rotation of the supporting roller associated with a particular angle of rotation of the workpiece and thus the number of the angle increment signals depends on the ratio of the diameters of the workpiece and of the supporting roller. If, however, the workpiece is positioned on the same or identical (i.e. equal diameter) supporting rollers, this ratio will cancel out. A device for carrying out the method with an unbalance measuring machine, in which the workpiece is mounted on supporting rollers, comprising
  (a) a contact-free pick-off device which is arranged to pick-off a mark on the workpiece to generate a reference signal, the mark being detected by the pick-off device in said predetermined angular position
is characterized in that
  (b) a device for generating unbalance measuring signals is provided, which represent, both with respect to amount and position, the unbalance to be measured, and
  (c) a signal shaping circut is provided to which the unbalance measuring signal is applied to generate a pulse-like unbalance position signal which has a fixed, predetermined phase relation with the unbalance measuring signal,
  (d) an angle increment signal generator is provided at least one supporting roller of the unbalance measuring machine, and generates a sequence of angle increment signals, which are synchronized with the supporting roller and each one of which corresponds to a fixed angle increment,
  (e) the angle increment signals are applied to a counter, which is arranged to be switched on by the reference signal and to be switched off by the unbalance position signal, and
  (f) means are provided for rotating the workpiece, starting from a predetermined angular position, in which the mark generates the reference signal, through an angle, which is a function of the number of angle increment signals stored in the counter.

Modifications of the method are subject matter of sub-claims 2 to 7.

Modifications of the device are subject matter of sub-claims 9 to 15.

Embodiments of the invention are described in greater detail hereinbelow with reference to the accompanying drawings.

Figure 1:
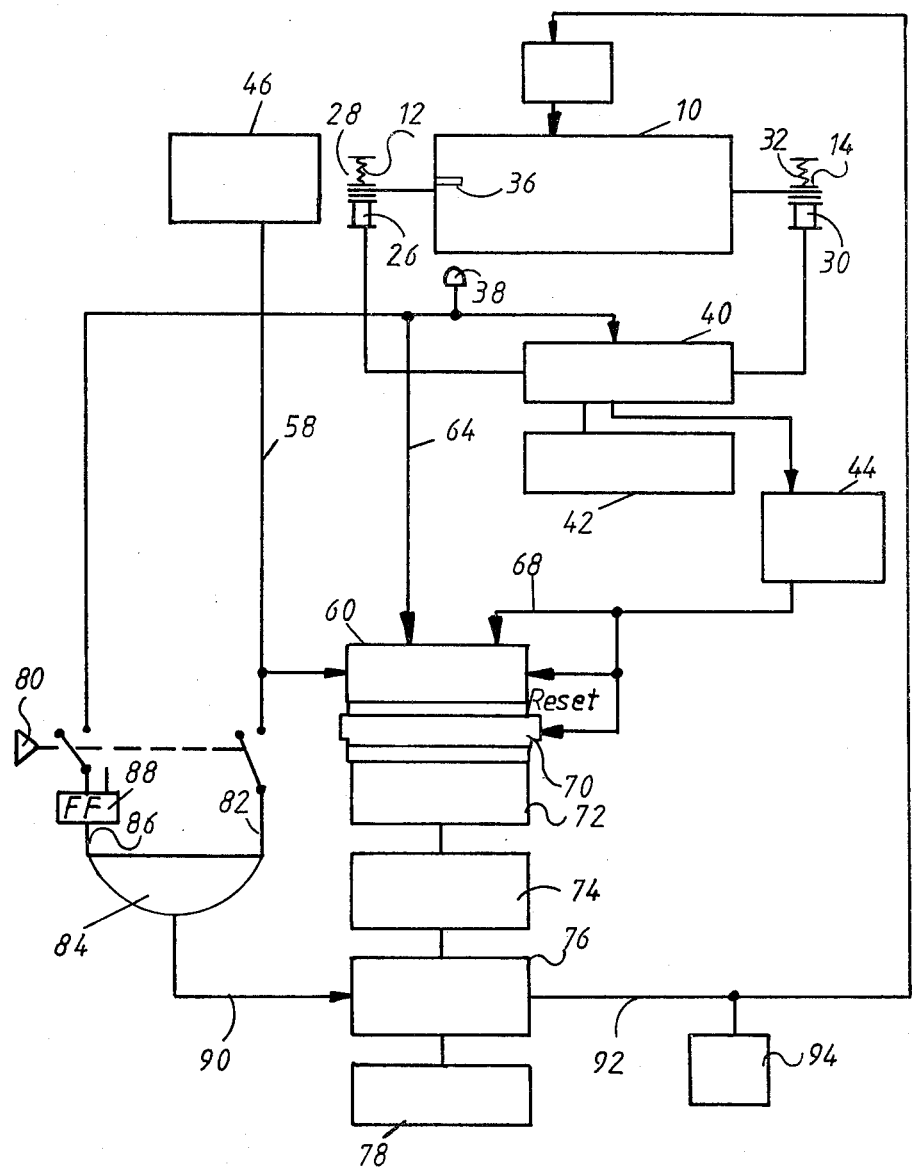
FIG. 1 is a schematic illustration of an unbalance measuring machine with a block diagram of the circuit.
Figure 2:
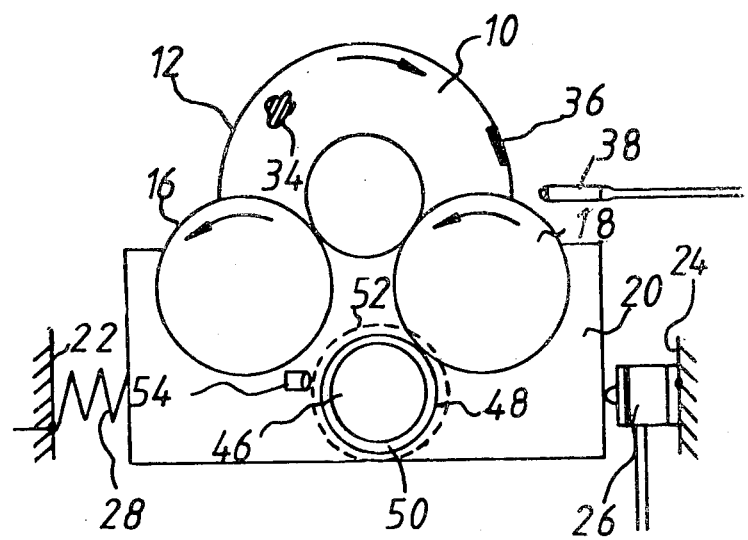
FIG. 2 is a schematic end view of the bearing and pick-up arrangement of an unbalance measuring machine with a workpiece to be balanced.

Referring to FIGS. 1 and 2, workpiece 10 to be balanced is mounted in bearings 12 and 14. as can be seen from FIG. 2, each bearing 12 and 14 comprises two supporting rollers 16 and 18, which are mounted easily rotatably on a vibration bridge 20.

The vibration bridge 20 is located in conventional manner between two parallel surfaces 22 and 24 of a pedestal. A force measuring pick-up 26 is arranged in front of surface 24. The vibration bridge 20 is pressed against the force measuring pick-up 26 by a spring 28. In similar manner the bearing 14 is constructed with a force measuring pick-up 30 and a spring 32.

In FIG. 2 it has been assumed that the workpiece 10 has an unbalance 34. A mark 36 is provided on the periphery of the workpiece 10. This mark is picked-off by a photoelectric pick-off device.

The workpiece 10 is driven in appropriate manner, the measurement being made in the coupling-free mode. This can be done in the manner described in U.S. Pat. No. 3,076,342 or by belt, compressed air or rotary field drive. The unbalance 34 creates a centrifugal force directed radially outwards, of which the respective horizontal component becomes effective on the force measuring pick-up 26. The horizontal component varies sinusoidally during rotation of the workpiece 10. The force measuring pick-up 26 generates a sinusoidal voltage therefrom. The centrifugal force is measured in the bearing planes, while the correction of the unbalance is effected usually in correction planes different therefrom. Therefore a signal processing circuit 40 is provided which computes the unbalances in the correction planes from the forces measured in the bearing planes. This signal processing circuit may, for example, be of one of the types disclosed in U.S. Pat. No. 2,815,666, U.S. Pat. No. 2,962,899 or U.S. Pat. No. 3,159,034. In the signal processing circuit also the angular position of the unbalance 34 relative to the mark 36 is determined from the phase of the a.c. voltage obtained relative to the signals received from the pick-off device. The informations thus obtained are stored in a signal memory 42.

From the sinusoidal a.c. voltage the phase of which depends on the position of the unbalance in the correction plane a sequence of pulse-like signals, the phase of which is determined by the phase of the a.c. voltage is generated in a signal shaping circuit 44. This signal shaping circuit 44 can be similar to the signal shaping circuits in the prior art unbalance measuring machines mentioned above, wherein the angular position of the unbalance is determined by having a stroboscope controlled by the a.c. voltage generated by the unbalance.

An angle increment signal generator 46 is coupled with the supporting roller 18, as shown in FIG. 2. To this end a frictional wheel 48 with a friction coating 50 engages the supporting roller 18. The frictional wheel 48 carries a code disc or drum 52 which is scanned optically or magnetically by a pick-off device 54, as schematically illustrated in FIG. 2.

Figure 3:
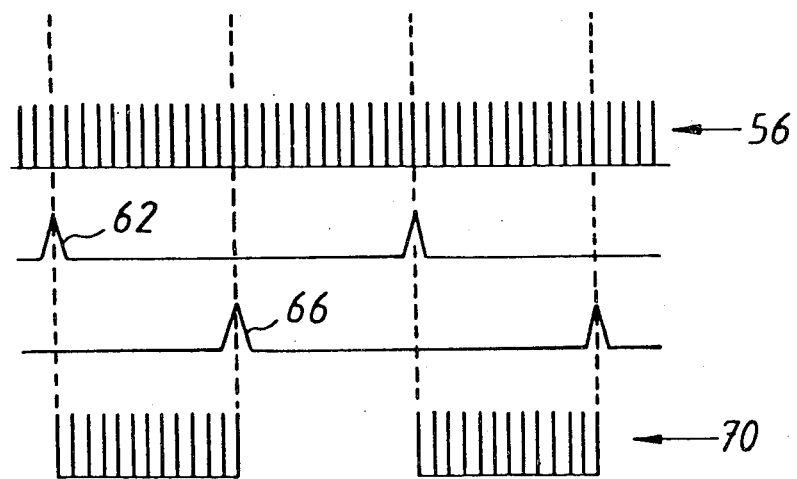
FIG. 3 shows the waveforms of signals which are generated with an unbalance measuring machine of FIG. 1.

The angle increment signal generator 46 provides with high resolution an angle increment signal in the form of a pulse with each angle increment, as is illustrated in simplified form by the pulse sequence 56 in FIG. 3. Actually the number of pulses generated with one complete revolution ($2\pi$) of the workpiece 10 is substantially higher than in FIG. 3.

The angle increment signals 56 from the angle increment signal generator 46 are applied to a counter 60 through line 58. The counter 60 is arranged to be switched on by the reference signal 62 (FIG. 3) from the pick-off device 38 through line 64, and to be switched off by an unbalance position signal 66 (FIG. 3) from the signal shaping circuit 44 through line 68. Thus the counter 60 counts a pulse sequence 70 (FIG. 3) the number of which is proportional to the time between reference signal 62 and unbalance position signal 66 and thus proportional to the angle between mark 36 and unbalance 34. The ratio of the diameters of frictional wheel 48 and supporting roller 18 and the usually unknown ratio of the diameters of the supporting roller 18 and the shaft of the workpiece 10 enter into the proportionality factor. These ratios, however, cancel out with the positioning, as will become apparent hereinbelow.

By the unbalance position signal the count is moved to a memory 72 through a gate 70. The counter is reset for the next count. This is known technique and therefore is not described in detail. A mean taking device 74 takes a mean value $\overline{m}_n$ of the numbers $m_i$ of angle increment signals counted and stored during a plurality of consecutive revolutions of the workpiece 10. The mean value $\overline{m}_n$ is stored in a memory 76. The value stored in the memory 76 is displayed by a display device 78.

After the measuring run the workpiece 10 is stopped. Now the unbalance 34 is to be rotated into a well-defined, for example horizontal, position. This procedure is called "positioning" of the workpiece.

In order to position the workpiece, a switch 80 is actuated, while the counter 60 and the mean taking device 74 are switched off and no longer affect the state of the memory 76.

When the workpiece 10 is rotated now, the angle increment signals 46 are applied to one input 82 of an AND-gate 84. The other input 86 of the AND-gate 84 is, at first, still in its state "L" (low), whereby the AND-gate 84 is non-conducting at first. When the mark 36 passes by the pick-off device 38, the latter provides a reference signal. This reference signal now sets flip-flop 88 through the closed switch 80. Flip-flop 88 applies a signal "H" (high) to the input 86 of the AND-gate 84. Thereby the AND-gate passes the angle increment signals from the angle increment signal generator 46 to a "down" input 90 of the memory 76, which is constructed similar to a counter. When the memory has been counted down to zero, it provides a signal at an output 92. A positioning indicator may be controlled by this signal to indicate that the workpiece has now been positioned properly, and the unbalance 34 is in a predetermined position, namely in the plane of the pick-off device 38. The workpiece may, however, also be positioned by means of the display device 78 which permits reading, when the memory or counter 76 passes through zero. Instead or in addition thereto the signal at the output 92 may serve to actuate a marking device 96, by which a mark is applied to the workpiece 10 at the location of the unbalance 34 for later unbalance correction.

As it is possible that the workpiece 10, when it is being positioned, is rotated beyond its end position and is then rotated back, the angle increment signal generator is preferably adapted to generate signals depending on the sense of rotation. The memory or counter 76 is a bidirectional counter the direction of counting of which is determined by the signals depending on the sense of rotation, as a function of the sense of rotation of the workpiece 10. When the workpiece 10 is rotated in the direction of the arrow in FIG. 2, in which direction it rotates also during the measuring run, the memory or counter 76 will be counted down. Then the counter reading becomes zero, when the unbalance 34 is in the plane of the pick-off device 38, thus is horizontal in FIG. 2. If the workpiece 10 is rotated in opposite direction, the memory or counter 76 is counted up again. The angle increment signal generator 46 can, for example, be of the type disclosed in U.S. Pat. No. 3,902,063.

The mean taking device 74 can be constructed such that the numbers $m_1, m_2 \ldots m_n$, of which the mean is to be taken, are compared with each other and only such numbers are utilized for taking the mean, the deviations of which from the others or from the mean value of the others are below a predetermined threshold "a". An error signal is triggered, when a deviation is above the threshold "a".

Figure 4:
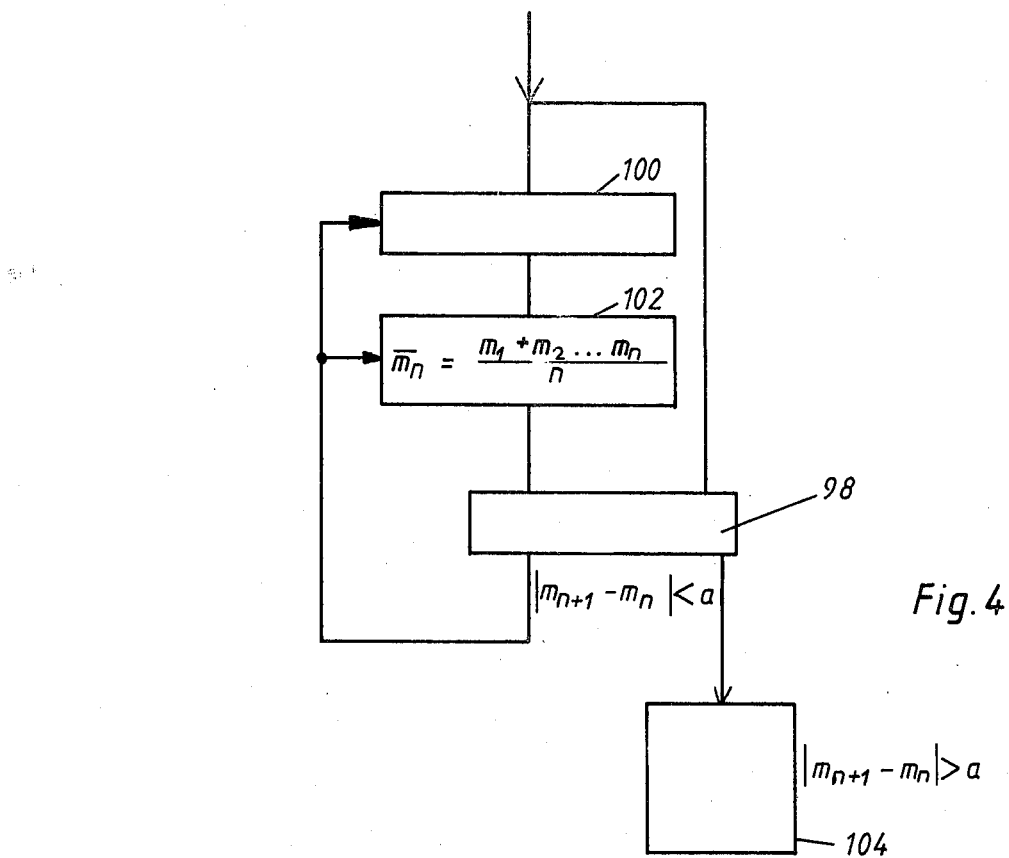
FIG. 4 shows a detail of FIG. 1.

A possible embodiment of the mean taking device 74 is illustrated in FIG. 4.

A number $m_{n+1}$ of counted angle increment signals is compared in a comparator 98 to a formerly taken mean value $$\overline{m}_n = \frac{m_1 + m_2 \ldots + m_n}{n}.$$

If $|m_{n+1} - \overline{m}_n| < a$, "a" being a threshold, a gate 100 will be opened and $m_{n+1}$ is passed to the mean taking circuit 102 for computing a new mean value. If $|m_{n+1} - \overline{m}_n| > a$, an error signal will be generated, as indicated by block 104.

Figure 5:
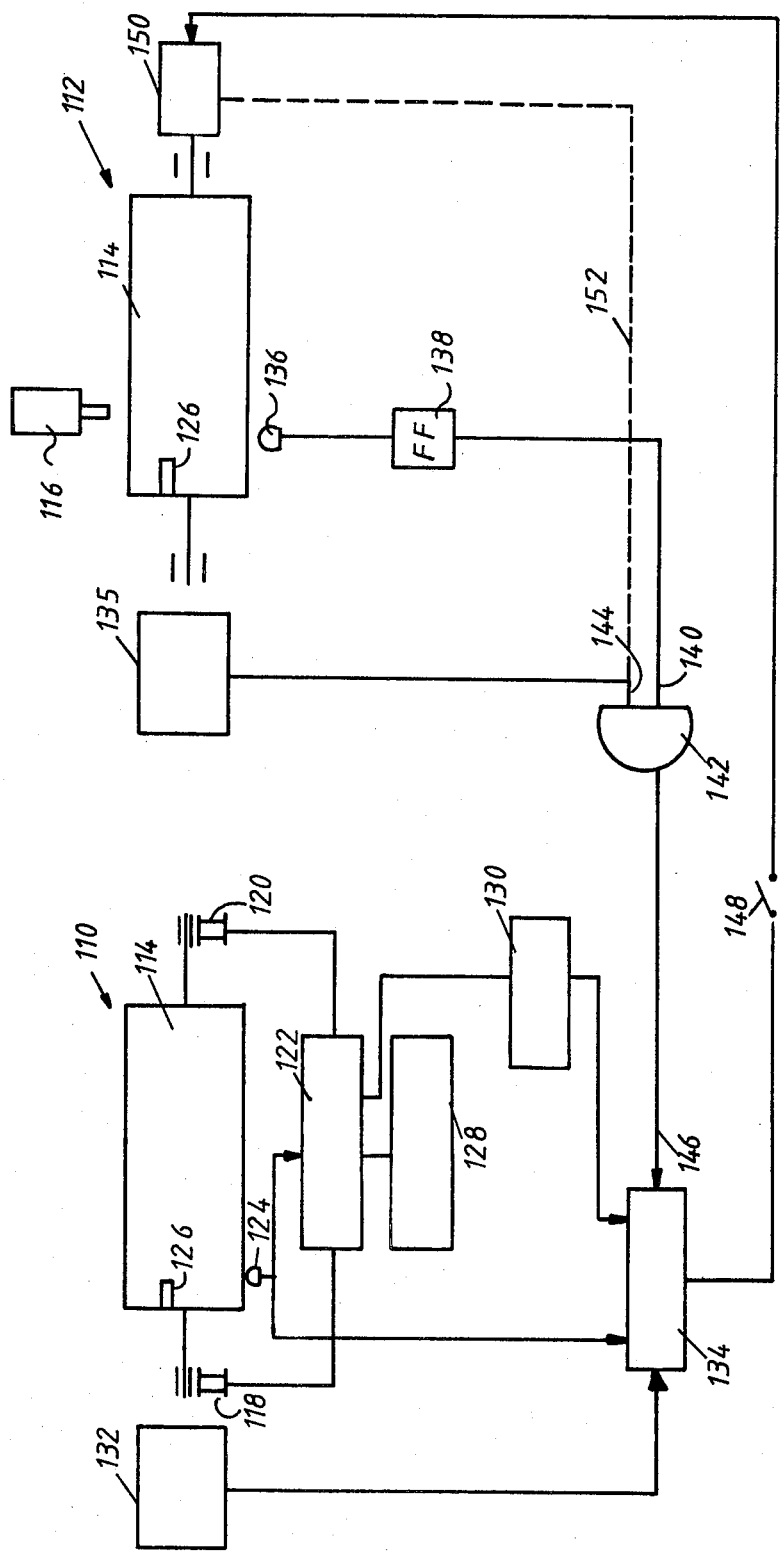
FIG. 5 shows another embodiment with an unbalance measuring machine and an unbalance correcting machine separate therefrom.

FIG. 5 shows another embodiment with an unbalance measuring machine 110 and an unbalance correcting machine 112 separate therefrom. The unbalance measuring machine 110 serves to determine the unbalance of a workpiece 114 to be balanced. Subsequently the workpiece 114 is placed on the unbalance correcting machine 112 and is positioned, and then the unbalance is corrected by means of a drilling machine.

As has been described with reference to FIGS. 1 and 2, the components of the centrifugal forces are measured in the bearing planes by pick-ups 118,120. The signals from the pick-ups 118,120 are supplied to a signal processing circuit 122. The signal processing circuit provides a.c. voltages which are analog to the unbalances in the correction planes. A pick-off device 124 detects a mark 126 on the workpiece 114 and generates a reference signal. The signal processing circuit 122 provides measured values of the amount and, if desired, of the position of the unbalance, which are stored in a memory 128. A signal shaping circuit 130 generates, from said a.c. voltage, a pulse-like unbalance position signal. In this respect the unbalance measuring machine 110 of FIG. 5 is identical with the unbalance measuring machine of FIG. 1.

Also the mounting of the workpiece 114 on the supporting rollers and the construction of an angle increment signal generator 132 coupled with the support rollers corresponds substantially to the embodiment of FIG. 2.

With the embodiment of FIG. 5 the angle increment signals from the angle increment signal generator 132 are applied to a bidirectional counter 134. The counter 34 is switched on by the reference signal from the pick-off device 124 and is switched off by the pulselike unbalance position signal from the signal shaping circuit 130. Thus, a number of angle increment signals proportional to the angle between mark and unbalance is counted in the counter, as illustrated in FIG. 3.

The workpiece 114 is then placed on the unbalance correcting machine 112. The unbalance correcting machine 112 has supporting rollers which are identical with (i.e. have the same diameter as) the supporting rollers of the unbalance measuring machine 110 and correspond substantially to the arrangement of FIG. 2. As in FIG. 2, an angle increment signal generator is coupled with one supporting roller.

The mark 126 of the workpiece 114 is detected by a pick-off device 136, which is similar to the pick-off device 124 and provides a reference signal for the positioning. The reference signal from the pick-off device 136 sets a flip-flop 138. Thereby a signal H is applied to one input 140 of an AND-gate 142, the other input 144 of which is connected to the angle increment signal generator 132. The output of the AND-gate 142 is connected to a count down input 146 of the counter 134. The counter controls, through a switch 148, a driving mechanism 150 which is arranged to rotate the workpiece 114 slowly.

When the switch 148 is closed, the drive mechanism rotates the workpiece 114. The angle increment signal generator 132 generates angle increment signals which, however, at first do not reach the count-down input 146 of the counter 134, as the AND-gate 142 is closed by the signal L at the input 146. When the mark 126 passes by the pick-off device 136, the reference signal sets the flip-flop 138, and the AND-gate gets the signal H at its input 140. It allows the angle increment signals to pass to the count down input 146 of the counter 134. The counter 134 is counted down to zero and then stops the drive mechanism 150. Then the unbalance is in the plane of the pick-off device 136. This plane contains also the drilling machine 116, which in FIG. 5 has been illustrated offset by 180° for clarity.

With different workpieces different numbers of angle increment signals are associated with a certain angle of rotation of the workpiece 10 or 114, depending on the diameter of the shaft of the workpiece. As, however, the workpiece is mounted, with the measuring run and with positioning, on identical or similar supporting rollers, this does not affect the measurement and positioning: Equal numbers of angle increment signals, at any rate, correspond to equal angles of rotation of the workpiece.

The angle increment signal generator can form part of the supporting roller.

The angle increment signal generator 46 in FIG. 1 may be a stepping motor. If such a stepping motor is rotated, it generates angle increment signals. This same stepping motor can then be used to position the workpiece 10. To this end pulses are applied to the stepping motor, whereby the stepping motor positions the workpiece 10 through the supporting roller 18. These pulses, at the same time, become effective as angle increment signals on line 58. The pulses applied to the stepping motor can be switched off, when the memory 76 has been counted down to zero.

In the embodiment of FIG. 5 a stepping motor for positioning the workpiece 114 can be coupled with one of the supporting rollers of the unbalance correcting machine 112. This stepping motor can, at the same time, represent the angle increment signal generator, the stepping signals supplied to the stepping motor serving as angle increment signals. The functions of the components 135 and 150 of FIG. 5 are then combined in component 150 which provides the angle increment signals too, as has been indicated by the dashed line 152. Component 135 and the line from it to the input 144 can then be omitted.

Of course, also the angle increment signal generator 132 may be a stepping motor.

I claim:
1. Method for positioning workpieces to be balanced such that the unbalance (34) measured by means of an unbalance measuring machine having a rotatable element (18) frictionally coupled with said workpiece assumes a predetermined position, wherein

(a) a reference signal (62) is generated with each revolution of the workpiece (10, 114), when the workpiece (10, 114) assumes a particular, predetermined angular position, characterized in that (b) during the measuring run on the unbalance measuring machine, an unbalance position signal (66) is generated with each revolution of the workpiece (10, 114) from an unbalance measuring signal, said unbalance position signal having a fixed, predetermined phase relation with the unbalance measuring signal, (c) with each revolution of the rotatable element (18) a sequence of angle increment signals synchronized therewith is generated, each one of which corresponds to a fixed angle increment of the rotatable element (18), (d) during the measuring run, these angle increment signals (56) are counted from the reference signal (62) to the unbalance position signal (66) and the number thereof is stored, and (e) for the subsequent positioning, the workpiece (10, 114) is rotated in the direction of rotation of the measuring run starting from a predetermined angular position through an angle which is a function of the stored number of angle increment signals (70).

2. Method as claimed in claim 1, characterized in that for the positioning the workpiece (10,114) is rotated through an angle, in which a number of angle increment signals corresponding to the stored number is generated.

3. Method as claimed in claim 1, characterized in that (a) with each measuring run, the numbers of the angle increment signals (70) occurring between reference signal (62) and unbalance position signal (66) are determined for a plurality of revolutions of the workpiece, and (b) a mean value is formed from the numbers thus obtained and is stored.

4. Method as claimed in claim 3, characterized in that (a) the numbers of which the mean is to be taken are compared with each other and (b) only such numbers are utilized for the taking of the mean, the deviations of which from the other numbers are below a predetermined threshold, and (c) an error signal is triggered, when a deviation is above the threshold.

5. Method as claimed in claim 1, characterized in that said positioning of the workpiece (10) is effected on the unbalance measuring machine.

6. Method as claimed in claim 5, characterized in that the workpiece (10) after said positioning, when the unbalance (34) is in a predetermined position, is provided with a mark indicating the position of the unbalance.

7. Method as claimed in claim 1, characterized in that (a) said positioning of the workpiece (114) is effected on an unbalance correcting machine (112) separate from the unbalance measuring machine (110), said unbalance correcting machine having a second rotatable element substantially identical with that of the unbalance measuring and frictionally coupled with the workpiece in substantially identical manner as the unbalance measuring machine (110), (b) with each revolution of said second rotatable element of the unbalance correcting machine (112) a sequence of angle increment signals synchronized therewith is generated, said angle increment signals corresponding to the same angle increments as the angle increment signals generated during the measuring run, (c) when the workpiece (114) is positioned on the unbalance correcting machine (112), a reference pulse is generated, when the workpiece (114) assumes a particular, predetermined angular position on the unbalance correcting machine (112), (d) the angle increment signals generated, when the workpiece is being positioned on the unbalance correcting machine, are counted from this latter reference pulse, and (e) the number thus counted is compared to the number determined and stored on the unbalance measuring machine (110), the positioning procedure being terminated when a predetermined relation between these numbers has been reached.

8. Device for positioning a workpiece to be balanced, said device having a rotatable element (18) frictionally coupled with said workpiece, comprising (a) a contact-free pick-off device (26,124) which is arranged to pick-off a mark (36,126) on the workpiece (10, 114) to generate a reference signal (62), the mark (36, 126) being detected by the pick-off device (38, 124) in said predetermined angular position, characterized in that (b) a device (40, 122) for generating unbalance measuring signals is provided, which represent, both with respect to amount and position, the unbalance to be measured (10, 114), and (c) a signal shaping circuit (44, 130) is provided to which the unbalance measuring signal is applied to generate an unbalance position signal which has a fixed, predetermined phase relation with the unbalance measuring signal, (d) an angle increment signal generator (46, 132) is provided at said rotatable element (18) of the unbalance measuring machine (110), and generates a sequence of angle increment signals (56), which are synchronized with the rotatable element (18) and each one of which corresponds to a fixed angle increment, (e) the angle increment signals (56) are applied to a counter (60, 134), which is arranged to be switched on by the reference signal (62) and to be switched off by the unbalance position signal (66), and (f) means are provided for rotating the workpiece, (10, 114), starting from a predetermined angular position, in which the mark (36, 126) generates the reference signal, through an angle, which is a function of the number of angle increment signals (70) stored in the counter (60, 134).

9. Device as claimed in claim 8, characterized in that for the determination of the angle of rotation of the workpiece (10, 114), (a) a counter (76, 134) which has been set to the stored number of angle increment signals, is arranged to be counted down by further angle increment signals from said rotatable element (18), on which the workpiece (10, 114) is mounted, and (b) the count-down is initiated by a reference signal generated, when the mark is picked-off, a predetermined count of this counter (76, 134) signalizing the correct position of the workpiece (10, 114).

10. Device as claimed in claim 9, characterized in that (a) the angle increment signal generator (46, 135) is adapted to generate signals depending on the sense of rotation, and (b) the counter (76, 134) is a bidirectional counter, the direction of counting of which is determined as a function of the sense of rotation of the workpiece (10, 114) by said signals depending on the sense of rotation.

11. Device as claimed in claim 8, characterized in that the angle increment signal generator forms part of a supporting roller, on which the workpiece is mounted.

12. Device as claimed in claim 8, characterized in that the angle increment signal generator (46, 132, 135) is in driving connection with the rotatable element (18) and a component separate from the rotatable element (18).

13. Device as claimed in claim 8, characterized by (a) a memory (72) which is arranged to store, with a measuring run, consecutively the number of angle increment signals counted by the counter during the various revolutions of the workpiece, and (b) a mean taking device (74) for taking the mean of the stored numbers as a measure of the rotation required for the positioning of the workpiece.

14. Device as claimed in claim 8, characterized by a marking device (96) on the unbalance measuring machine, said marking device being adapted to apply a mark indicating the position of the unbalance to the workpiece (10), after the workpiece (10) has been positioned.

15. Device as claimed in claim 8, characterized in that (a) an unbalance measuring machine (110) and an unbalance correcting machine (112) are provided, (b) the unbalance measuring machine (110) and the unbalance correcting machine (112) have identical supporting rollers for mounting the workpiece (114), (c) the unbalance measuring machine (110) and the unbalance correcting machine (112) each have an angle increment signal generator (132,135) at a respective supporting roller, the two angle increment signal generators (132,135) being functionally identical, (d) a contact-free pick-off device (124,136) is arranged on each of the unbalance measuring machine (110) and the unbalance correcting machine (112) to pick-off a mark (126) on the workpiece for generating a reference signal, and (e) the counting-up of the angle increment signals during the measuring run on the unbalance measuring machine (110) is initiated by the reference signal generated by the pick-off device (124) of the unbalance measuring machine (110), and the counting-down during the positioning procedure on the unbalance correcting machine is initiated by the reference signal generated by the pick-off device (136) of the unbalance correcting machine (122).

16. Device as claimed in claim 8, characterized in that (a) a stepping motor for positioning the workpiece is coupled to said one supporting roller, and (b) the stepping motor, at the same time, serves as said angle increment signal generator, the signals generated by the stepping motor or the stepping signals supplied to the stepping motor serving as angle increment signals.

* * * * *